D. W. HOSTETLER.
VEHICLE BRAKE.
APPLICATION FILED DEC. 18, 1912.
1,070,686.
Patented Aug. 19, 1913.
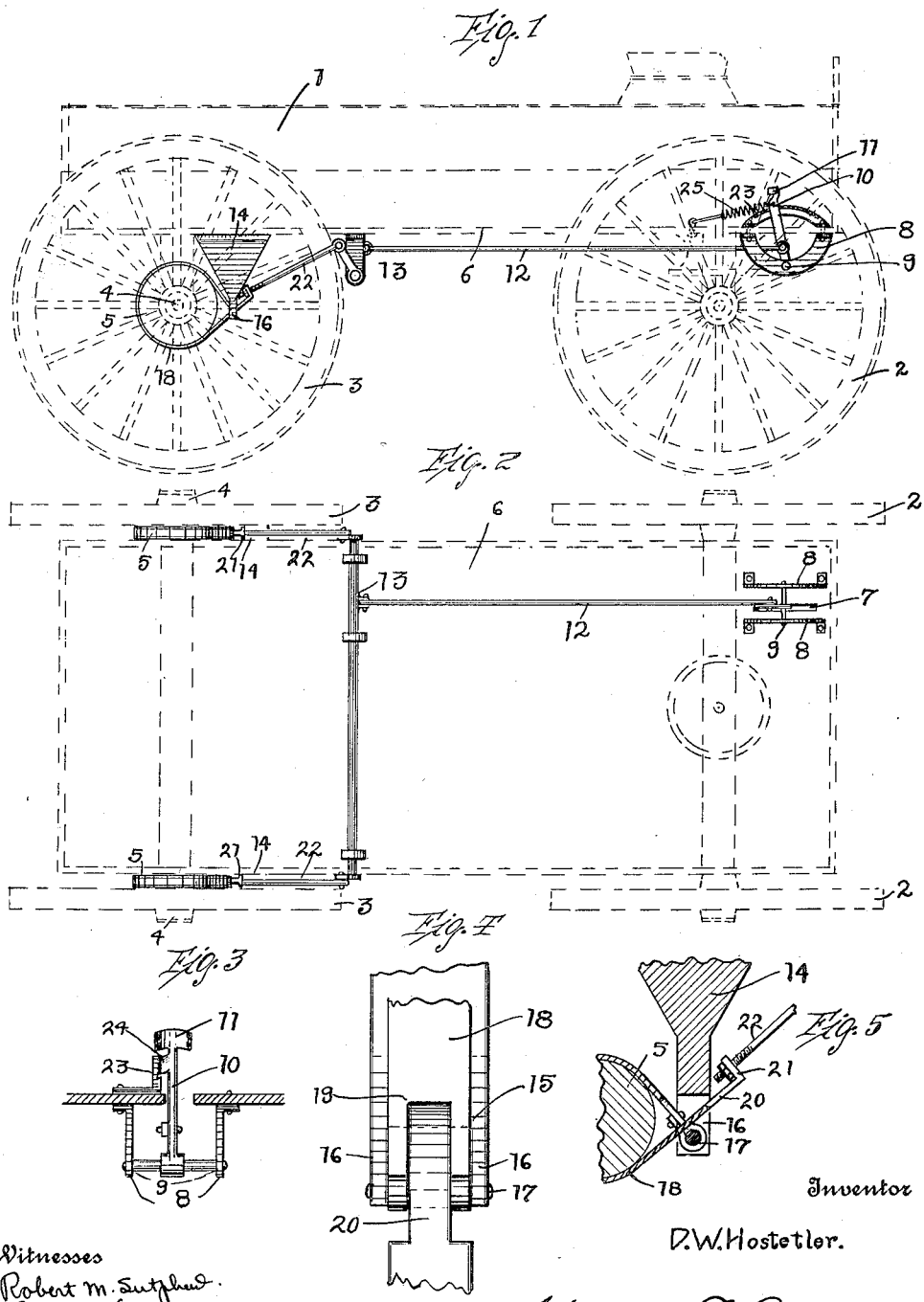

UNITED STATES PATENT OFFICE.

DAVID WALTER HOSTETLER, OF THOMPSONTOWN, PENNSYLVANIA.

VEHICLE-BRAKE.

1,070,686.  Specification of Letters Patent.  Patented Aug. 19, 1913.

Application filed December 18, 1912. Serial No. 737,518.

*To all whom it may concern:*

Be it known that I, DAVID WALTER HOSTETLER, a citizen of the United States, residing at Thompsontown, in the county of Juniata and State of Pennsylvania, have invented certain new and useful Improvements in Vehicle-Brakes, of which the following is a specification, reference being had to the accompanying drawings.

This invention relates to new and useful improvements in brakes, and more particularly to that class of brakes which are adapted for use in connection with buggies or other similar vehicles.

An object of this invention is the provision of a brake which may be readily operated upon the application of pressure to the foot lever and which will be readily released when the pressure is removed from the foot lever.

A further object of this invention is the provision of a brake comprising a foot lever pivotally connected to the forward end of the vehicle, the foot lever being suitably connected to the brake bands which are pivotally mounted upon the hubs of the rear wheels.

With these and other objects in view, my invention resides in the novel constructions, arrangements and combinations of parts to be hereinafter more fully described, claimed and illustrated in the accompanying drawing, in which, Figure 1 is a side elevation of my device applied to a vehicle; Fig. 2 is a bottom plan view thereof; Fig. 3 is a detail section showing the operating lever; Fig. 4 is a front elevation of one of the supporting members showing its connection with the brake bands; and Fig. 5 is a side elevation of the parts shown in Fig. 4.

Referring more particularly to the drawing, the numeral 1 designates the body of the vehicle having the usual front wheels 2 and rear wheels 3, the hubs 4 of the rear wheels having suitable bearing bands 5 secured to their outer peripheries. The floor 6 of the body is formed near its forward end with a longitudinal opening 7 and depending from the floor 6 adjacent the opening therein, is a supporting plate 8 to which is pivotally connected as at 9, one end of the operating lever 10 which extends upwardly through the opening 7 and has mounted on the upper extremity thereof, a suitable foot pedal 11. Pivotally connected to the operating lever 10 intermediate of its ends is one end of an operating rod 12, the opposite end of the rod being pivotally connected to the lower end of the hanger rod 13 which is pivotally connected to the floor 6 of the body and extends transversely thereof from one side to the other.

Secured to the floor 6 of the body portion of the vehicle near the rear end thereof are a pair of supporting plates 14 which depend from the body of the vehicle and extend to a point adjacent the hubs 4 of the rear wheels of the vehicle. The lower ends of the supporting plates 14 are forked as at 15 and secured between the arms 16 of the supporting members at the lower extremities thereof, is a shaft 17. Brake bands 18 are disposed around the hubs 4 of the rear wheels, the brake bands being adapted to bear against the bearing bands 5 on the hubs, and one end of the bands being forked as at 19 and being pivotally secured to the shaft 17 between the arms 16 of the supporting members 14. The opposite ends of the brake bands 18 are formed with reduced extensions 20, the extensions being disposed through the forked portions of the supporting members and the opposite ends of the brake bands, the extremities of the reduced portions 20 being formed with apertured flanges 21. Secured in the apertured flanges 21 of the brake bands, are connecting rods 22 which are pivotally connected at their opposite ends to the hanger rod 13 at the central portion of the vehicle. A suitable rack bar 23 is disposed longitudinally in the opening 7, and the operating lever 10 is loosely mounted at its fulcrum point, and the lever 10 is formed intermediate of its ends with a pawl or dog 24 for engagement with the rack 23. It will be seen that the lever 10 may be locked to the rack 23, and the lever may be removed from engagement with the rack bar by lateral movement thereof, whereupon the lever will be returned to normal position by the tension of the contractile spring 25 which is secured at one end to the lever and at its opposite end to the body of the vehicle.

From the above description, taken in connection with the accompanying drawing, it will be seen that the forked ends 19 of the brake bands will be held from movement by their connection to the shafts 16 on the lower forked end of the supporting members 14. As the reduced extensions 20 on the opposite ends of the brake bands, are slidably disposed through the forked portions of the supporting members 14 and the forked ends 19 of the brake bands, movement of the operating lever 10 will serve to draw the reduced extensions 20 forwardly through the agency of the connecting rods 23 and the operating lever 12, whereby the brake bands 18 will be tightened against the bearing bands 5 on the hubs and serve to diminish the speed of the vehicle. It will be seen that the shafts 17 in the lower ends of the supporting members 14 will hold the ends of the brake bands closely adjacent to each other so that the brake bands will be applied to the greater portions of the hubs, when the lever 10 is actuated so that a greater amount of pressure will be brought to bear upon the bearing bands 5 on the hubs.

Having thus described my invention what I desire to claim and secure by Letters Patent is:

1. In combination with a wheeled vehicle, a supporting member depending from the body of said vehicle adjacent one of the wheels thereof, a brake band arranged to operate on the hub of said wheel, said supporting member being forked at its lower end, a shaft disposed between the arms of the forked portion of said supporting member, one end of said brake band being forked and connected to said shaft, and the opposite end of said band extending through the forked portions of said band and said supporting member, and operating means connected to the free end of said brake band, as and for the purpose described.

2. In combination with a wheeled vehicle, a supporting member depending from the body of said vehicle adjacent one wheel thereof, said supporting member being forked at its lower end, a shaft disposed between the extremities of the arms of the forked portion of said member, a brake band arranged to operate on the hub of said wheel, one end of said brake band being forked and loosely connected to said shaft between the arms of the forked portion of said member, the free end of said band being reduced and disposed through the forked portion of said band, the width of the reduced portion of said band being substantially the same as the distance between the arms of the forked portion thereof, and operating means connected to the reduced portion of said brake band, as and for the purpose described.

In testimony whereof I hereunto affix my signature in the presence of two witnesses.

DAVID WALTER HOSTETLER.

Witnesses:
I. O. FELMELL,
F. Y. DUNN.

---

Copies of this patent may be obtained for five cents each, by addressing the "Commissioner of Patents, Washington, D. C."